United States Patent
Neihoff

(10) Patent No.: US 6,453,271 B1
(45) Date of Patent: Sep. 17, 2002

(54) METHOD AND DEVICE FOR SYNCHRONIZING CLOCK SIGNALS

(75) Inventor: Björn Neihoff, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/325,802

(22) Filed: Jun. 4, 1999

(30) Foreign Application Priority Data

Jun. 4, 1998 (DE) .......................................... 198 25 070

(51) Int. Cl.[7] .......................... G06F 15/00; H03F 1/26; H04B 15/00
(52) U.S. Cl. ........................................ 702/189; 702/127
(58) Field of Search ............................ 702/189, 66, 70, 702/75, 127; 375/340, 355, 354, 377; 700/73, 79

(56) References Cited

U.S. PATENT DOCUMENTS

| | | | | |
|---|---|---|---|---|
| 3,925,650 A | * | 12/1975 | Brown | 702/70 |
| 4,137,427 A | * | 1/1979 | Choquet et al. | 375/355 |
| 4,176,337 A | * | 11/1979 | Aechter et al. | 367/138 |
| 4,453,223 A | * | 6/1984 | Ravel | 702/79 |
| 4,692,931 A | * | 9/1987 | Ohsawa | 375/106 |
| 4,810,959 A | * | 3/1989 | Padawer | 324/7 |
| 5,351,271 A | * | 9/1994 | Coquerel | 375/10 |
| 6,049,575 A | * | 4/2000 | Moridi | 375/355 |

FOREIGN PATENT DOCUMENTS

| | | |
|---|---|---|
| DE | 19701932 C1 | 4/1998 |
| DE | 19701931 C1 | 5/1998 |
| EP | 0 055156 | 6/1982 |
| EP | 0 750 203 | 12/1996 |

OTHER PUBLICATIONS

ETSI European Telecommunications Standard ETS 300462–1, Apr. 1997;.

ITU–T Recommendation G.810, Series G: Transmission Systems and Media, Aug. 1996.

G. Dahlquist, A Bjorck, "Numerical Methods", 1974, Prentice–Hall, Englewood Cliffs, N.J., pp. 14–15, 1974.

* cited by examiner

Primary Examiner—Marc S. Hoff
Assistant Examiner—Demetrius Pretlow
(74) Attorney, Agent, or Firm—Burns, Doane, Swecker & Mathis, L.L.P.

(57) ABSTRACT

This specification describes a method and device for measuring a variation value, where a value representative of a variation between a quantity Q and a reference quantity Qref is determined by calculating error samples $x_i$ and then determining the value R representative of the variation from $$R = w_1^2 + \sum_{j=2}^{N-3n+1} w_j^2$$

where each value of $w_j$ is recursively determined from the previous value $w_{j-1}$. Through this recursive determination, a nested loop is avoided, whereby the amount of necessary calculation is greatly reduced.

14 Claims, 13 Drawing Sheets

METHOD AND DEVICE FOR SYNCHRONIZING CLOCK SIGNALS

FIELD OF THE INVENTION

The field of the invention relates to a method and device for measuring a value that characterizes a variation between a quantity and a reference quantity, where said variation is measured with respect to a parameter on which both the quantity and reference quantity depend. An example of this is the determination of a variation between a signal and a reference signal, both of which depend on time.

BACKGROUND OF THE INVENTION

A well known measure of variation is the variance which is defined as the mean value of the square of the difference between a sample value and the mean value of the samples. The standard deviation is the square root of the variance.

Specifically in connection with the characterization of timing signals, a measure of the time variation as a function of integration time is known, which is referred to as TDEV (time deviation) and is e.g. defined in ETSI European Telecommunication Standard ETS 300462-1, April 1997 or ITU-T Recommendation G.810, Series G: Transmission Systems and Media, August 1996. A time deviation TDEV is defined as $$TDEV(n\tau_0) = \sqrt{\frac{1}{6n^2}\left\langle\left[\sum_{i=1}^{n}(x_{i+2n} - 2x_{i+n} + x_i)\right]^2\right\rangle} \quad (1)$$

where the angle brackets denote an ensemble average, and $x_i$, with $i=1, 2, \ldots N$, are sample values of a time error function $x(t)$ and these samples are taken at equidistant time intervals. The time dependent error function $x(t)$ is defined as the difference between a clock generating time $T(t)$ and a reference clock generating time $Tref(t)$. Here, t is therefore to be understood as the absolute (abstract) time, whereas T is a signal generated by a clock that depends on t and itself also represents a time. The N sample values are sampled at equal intervals $\tau_0$, such that $x_i=x(i\cdot\tau_0)$, $i=1, 2, \ldots N$. $\tau_0$ is the sampling period and $\tau=n\cdot\tau_0$ is the observation interval.

The ensemble average relates to the observation interval in the sense that an average is taken over possible triplets $x_i+2n$, $x_i+n$, $x_i$.

The above mentioned documents contain an estimator formula for TDEV, which is:

$$TDEV(n\tau_0) = \sqrt{\frac{1}{6n^2}\frac{1}{(N-3n+1)}\sum_{j=1}^{N-3n+1}\left[\sum_{i=j}^{n+j-1}(x_{i+2n} - 2x_{i+n} + x_i)\right]^2} \quad (2)$$

where $n=1, 2, \ldots$ the integer part of $N/3$.

PROBLEM UNDERLYING THE INVENTION

The problem with the above estimator formula is that a calculation results in two nested FOR-loops for the summation under the square root, and in three nested FOR-loops when calculating the values TDEV for all values of n, which is often required. With large values of N, which is typically the case, this results in a large calculation burden which either leads to long calculation times or to an increased amount of hardware for coping with the calculation burden in a reasonable amount of time. As an example, in communication systems using the above described TDEV as a control parameter for synchronization control, this leads to more circuitry, which makes the systems more complicated and more expensive.

The above mentioned problem is not restricted to systems calculating the deviation for a clock signal with respect to a reference clock signal over time, but will occur in any system based on the above principle of calculating a value representative of a variation based on the double sum $$\sum_{j}\left[\sum_{i=f_1(j)}^{f_2(j)}(x_{i+2n} - 2x_{i+n} + x_i)\right]^2, \quad (3)$$

where the lower and upper boundaries of the inner sum running over i are respective functions ($f_1$ and $f_2$) of the outer variable j.

OBJECT OF THE INVENTION

The present invention has the object of providing a better method of measuring a value characteristic of the variation between a quantity and a reference quantity, said value being based on the above described double sum.

SUMMARY OF THE INVENTION

This object is solved by the methods and devices described in the independent claims appended to the present application. Advantageous embodiments are described in the dependent claims.

The present invention greatly simplifies the determination of a value representative of the variation between a quantity and a reference quantity by employing a recursive formula, such that the two nested FOR-loops mentioned above can be avoided.

More specifically, the present invention defines a first value $w_1$ as a function of the difference values $x_j$, which represent differences between the quantity and the reference quantity, and determines the value R, which corresponds to the above mentioned double sum, through $$R = w_1^2 + \sum_{j=2}^{N-3n+1} w_j^2 \quad (6)$$

where each consecutive value of $w_j$ is not calculated by running through a total sum, but is recursively determined from the respectively previous value $w_{j-1}$. n is a value between 1 and the integer part of N/3.

In this way the present invention achieves a simpler and less time consuming calculation of the value R, such that the measurement method of the present invention enables a simpler and cheaper hardware, without any decrease in efficiency. More specifically, the calculation of the double sum of the above mentioned equation (3) requires floating point operations in a number depending on $N^2$, whereas the method of the present invention only requires a number of floating point operations depending on N.

Therefore, the present invention decreases the required processing capacity and processing time, to thereby lead to better and/or cheaper hardware.

According to a preferred embodiment of the present invention, the calculation of $w_1$ is done in accordance with $$w_1 = \sum_{k=1}^{n} (x_{k+2n} - 2x_{k+n} + x_k),$$

and the recursive calculation of $w_j$ in accordance with $$w_j = w_{j-1} + x_{j-1+3n} - 3x_{j-1+2n} + 3x_{j-1+n} - x_{j-1}.$$

According to another preferred embodiment of the present invention, the calculation of $w_1$ is performed by introducing a help variable y, where $$y_k = x_{k+2n} - 2x_{n+k} + x_k \quad (8)$$

and $$w_1 = \sum_{k=1}^{n} y_k \quad (9)$$

such that the recursive formula for $w_j$ becomes $$w_j = w_{j-1} + y_{j-1+n} - y_{j-1} \quad (10)$$

According to further preferred embodiments, the values R, which depend on n, can be used to calculate a variance and a deviation value, either for individual values of n, or for all values of n from 1 to the integer part of N/3.

As another preferred embodiment of the present invention, the measurement method is applied to a communication system requiring synchronization, in which the deviation value that is calculated relates to the variation between a clock signal and a reference clock signal. According to another preferred embodiment, the present invention is applied to a system in which a surface profile level is compared to a reference profile level, and samples are measured at equal location intervals, such that the measured characteristic variation value relates to the spatial variation of the surface level.

As already mentioned above, the present invention can be applied to a system calculating a value characteristic of a variation on the basis of the above mentioned double sum shown in equation (3).

DETAILED DISCLOSURE

Figure 1A:
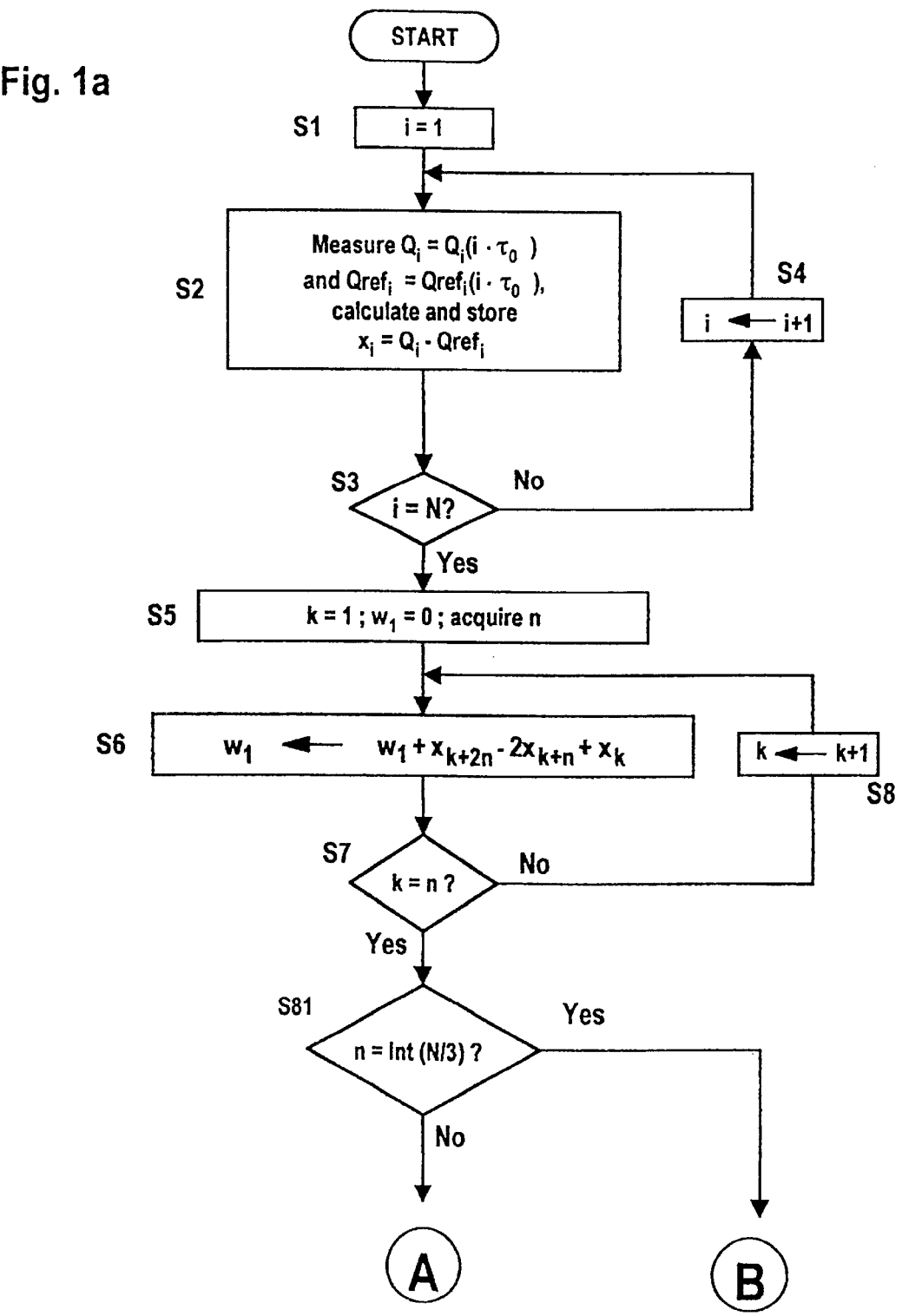
FIGS. 1a and 1b show a flow-chart illustrating a first embodiment of the present invention.
Figure 1B:
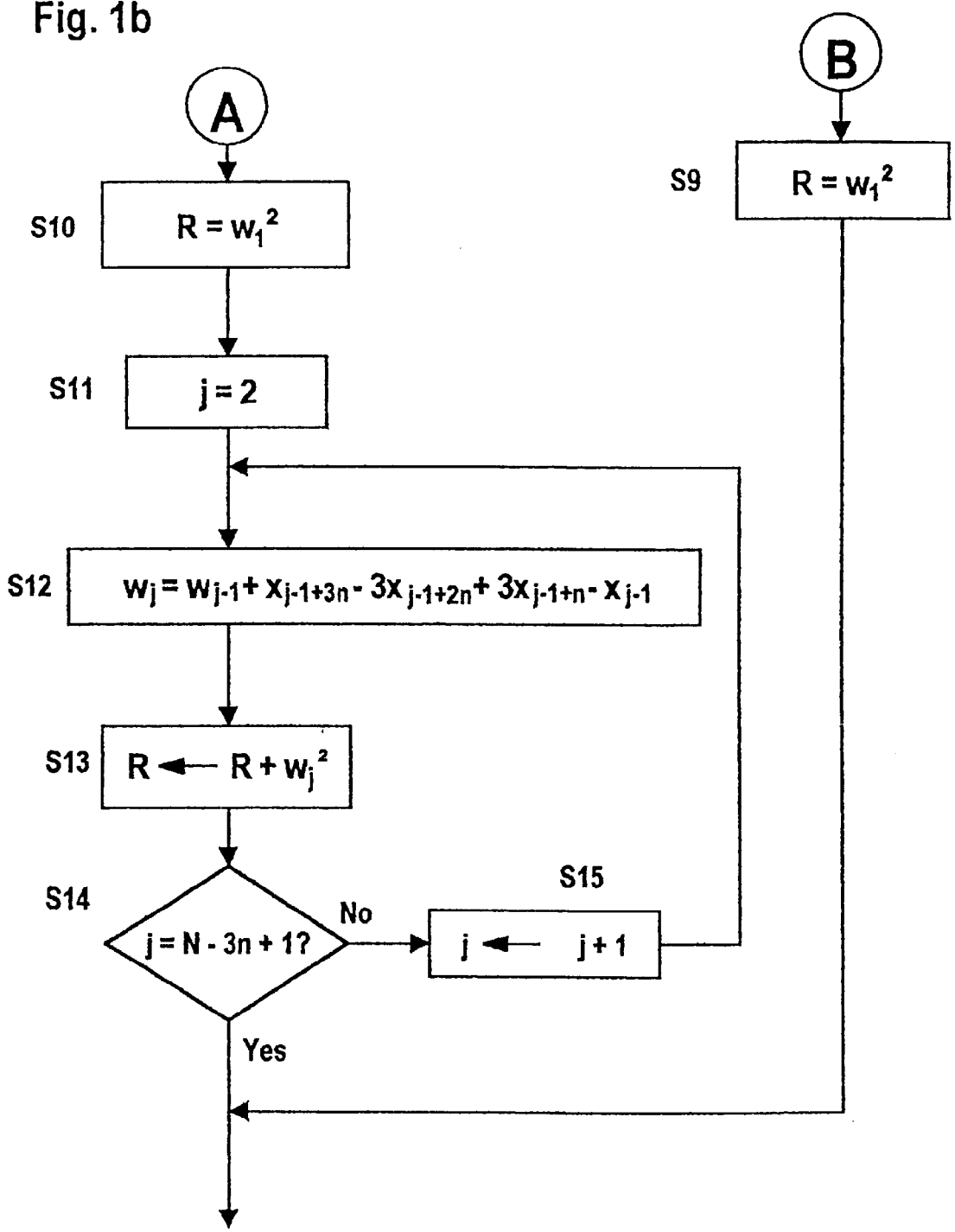

FIG. 1 shows a flow-chart of a first embodiment of the present invention, where FIG. 1a shows the first part and FIG. 1b the second part. As can be seen, in a first step S1 a loop variable i is set to a starting value of 1. Then, in step S2, a quantity Q, which depends on a given parameter t is measured at equidistant intervals $\tau_0$, together with a reference quantity Qref associated with Q, where Qref also depends on the parameter t. In this way, samples $Q_i = Q(i \cdot \tau_0)$ and $Qref_i = Qref(i \cdot \tau_0)$ are measured. Also, the difference between $Q_i$ and $Qref_i$ is determined to thereby supply error samples $x_i = Q_i - Qref_i$. It is self-understood that the error function can also be defined as $Qref_i - Q_i$. It should be noted that t represents any possible parameter, such as time, location, etc. The interval $\tau_0$ is naturally measured in the same units as the parameter t.

Figure 4:
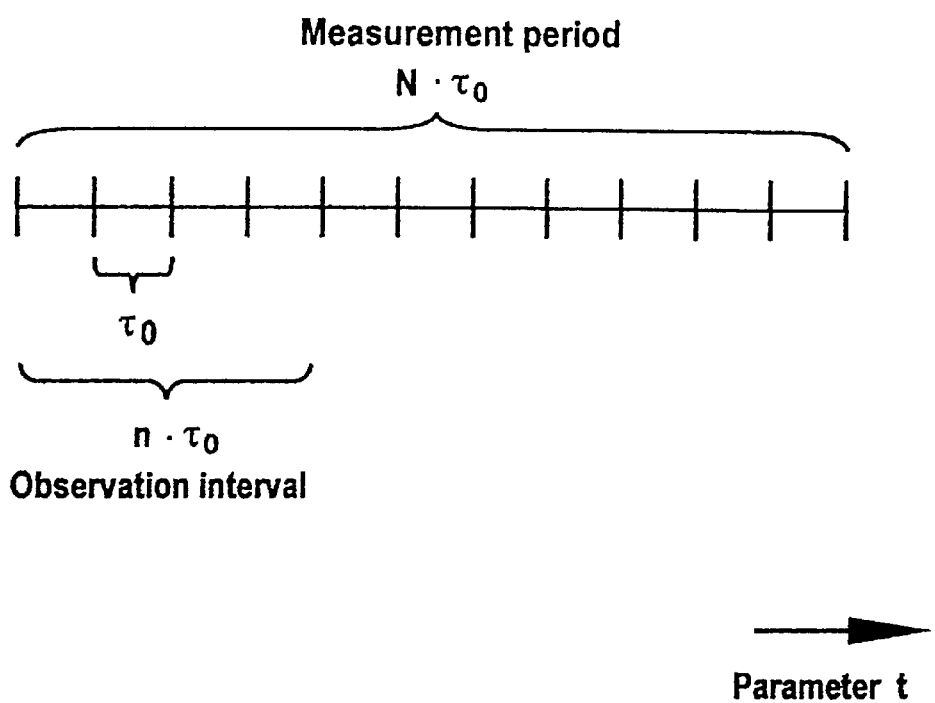
FIG. 4 is a diagram illustrating the sampling number N, the measurement period $N\tau_0$, the sampling interval $n\tau_0$, and the basic interval $\tau_0$.

Then, N samples are determined by running through the loop constituted by steps S2, S3 and S4, where step S3 determines if i=N, and if not, then S4 increments the loop variable i to i+1. N is a parameter that characterizes the measurement period, as will be explained in more detail in connection with FIG. 4. With regard to the present invention, it is of no importance how N is set or acquired, i.e. with respect to the invention, N can be seen as an arbitrary, given parameter.

It should be noted that the quantity Q can be any measurable quantity, just as the parameter t can be any parameter on which a quantity can depend. As an example, Q can be a clock signal T and the parameter t can be the actual time, so that x would be the difference between a clock signal T(t) and a reference clock signal Tref(t) at equal spacing sample points defined by the time interval $\tau_0$. On the other hand, the quantity Q can equally well be a surface level value and the parameter referred to as t a one dimensional location along said surface, such that x represents error values between surface level values and reference surface level values at points of equal distance $\tau_0$ along a direction in said surface.

After the samples $x_i$ are determined, a second loop using a loop variable k determines a value $W_1$. More specifically, in step S5 the loop variable k is set to 1 and the value $W_1$ is set to 0. Then, a loop consisting of steps S6, S7 and S8 determines a value $W_1$ in accordance with the above mentioned equation (4) which is $$w_1 = \sum_{k=1}^{n} (x_{k+2n} - 2x_{k+n} + x_k) \quad (4)$$

This is done by replacing the value $W_1$ by $W_1 + X_{k+2n} - 2x_{k+n} + x_k$ in step S6, then determining if k=n in step S7 and incrementing k to k+1 in step S8 if the result in S7 is negative.

It should also be noted that the value for n is acquired in step S5. As will be explained in more detail in connection with FIG. 4, n is a parameter that characterizes the observation interval. With regard to the present invention, n can be acquired or set in any desirable or suitable way. For example, n can be a stored value that is simply read by the system in step S5. Or the user may be prompted to enter a desired value. Or the system may have a sub-routine for determining a value of n. As can be seen, it is of no importance to the invention how and where n is set, as long as the value of n lies between 1 and the integer part of N/3.

Then, in step S81 it is determined if n is equal to the integer part of N/3, and if this is the case, then the value R, which represents the above mentioned double sum $$\sum_j \left[ \sum_i (x_{i+2n} - 2x_{i+n} + x_i) \right]^2 \quad (3)$$

is determined as $R=W_1^2$. This is shown in step S9 (see FIG. 1b).

On the other hand, if in step S81 it is determined that n is smaller than the integer part of N/3, then the processing proceeds to step S10, in which again the above mentioned value of R is set to $w_1^2$ but then processing continues by setting the loop variable j to 2 in step S11 and then entering the loop as S12, S13, S14 and S15 to thereby determine the value R as $$R = w_1^2 + \sum_{j=2}^{N-3n+1} w_j^2 \quad (6)$$

where each value $w_j$ is determined recursively from the previous value of w, i.e. $w_{j-1}$ by $$w_j = w_{j-1} + x_{j-1+3n} - 3x_{j-1+2n} + 3x_{j-1+n} - x_{j-1} \quad (7)$$

This is done by calculating the new value of $w_j$ in accordance with the above mentioned equation (7) in steps S12, then replacing the value of R by $R+w_j^2$ in step S13, asking if the value j has reached N−3n+1 in step S14 and incrementing j to j+1 in step S15 if the result of step S14 is negative.

The processing after step S14 or S9 runs together again, i.e. the value of R is then employed in any suitable way, e.g. output to a control means that responds to the measure of variation between Q and Qref expressed by R, or the value R is processed further, e.g. a variance value VAR is determined as $$VAR = \frac{R}{6n^2(N - 3n + 1)} \quad (11)$$

and/or a deviation value is determined as $DEV=(VAR)^{1/2}$ or $$DEV = \sqrt{\frac{R}{6n^2(N - 3n + 1)}} \quad (12)$$

The above mentioned embodiment calculates one value representative of a variation between a quantity Q and a reference quantity Qref associated with Q in dependence on a parameter n, where n determines the observation interval in the form of $n \cdot \tau_0$. n can be assigned or have any value between 1 and the integer part of N/3, where N indicates the measurement period $N \cdot \tau_0$.

As can be seen, the above embodiment does not contain any nested loops, i.e. loops that are part of a larger outer loop. In this way, the above described double sum $$\sum_j \left[ \sum_{i=f_1(j)}^{f_2(j)} (x_{i+2n} - 2x_{i+n} + x_i) \right]^2 \quad (3)$$

is calculated only from single, independent loops, so that the amount of necessary calculation only depends linearly on the sample size, i.e. only depends on N, in contrast to a conventional solution of the double sum, which would lead to a number of calculations depending on $N^2$. Therefore, the above described embodiment achieves a better measurement method, as the amount of calculation is considerably reduced, namely by a factor of N, which in turn allows a far simpler and/or more efficient hardware implementation.

Figure 2A:
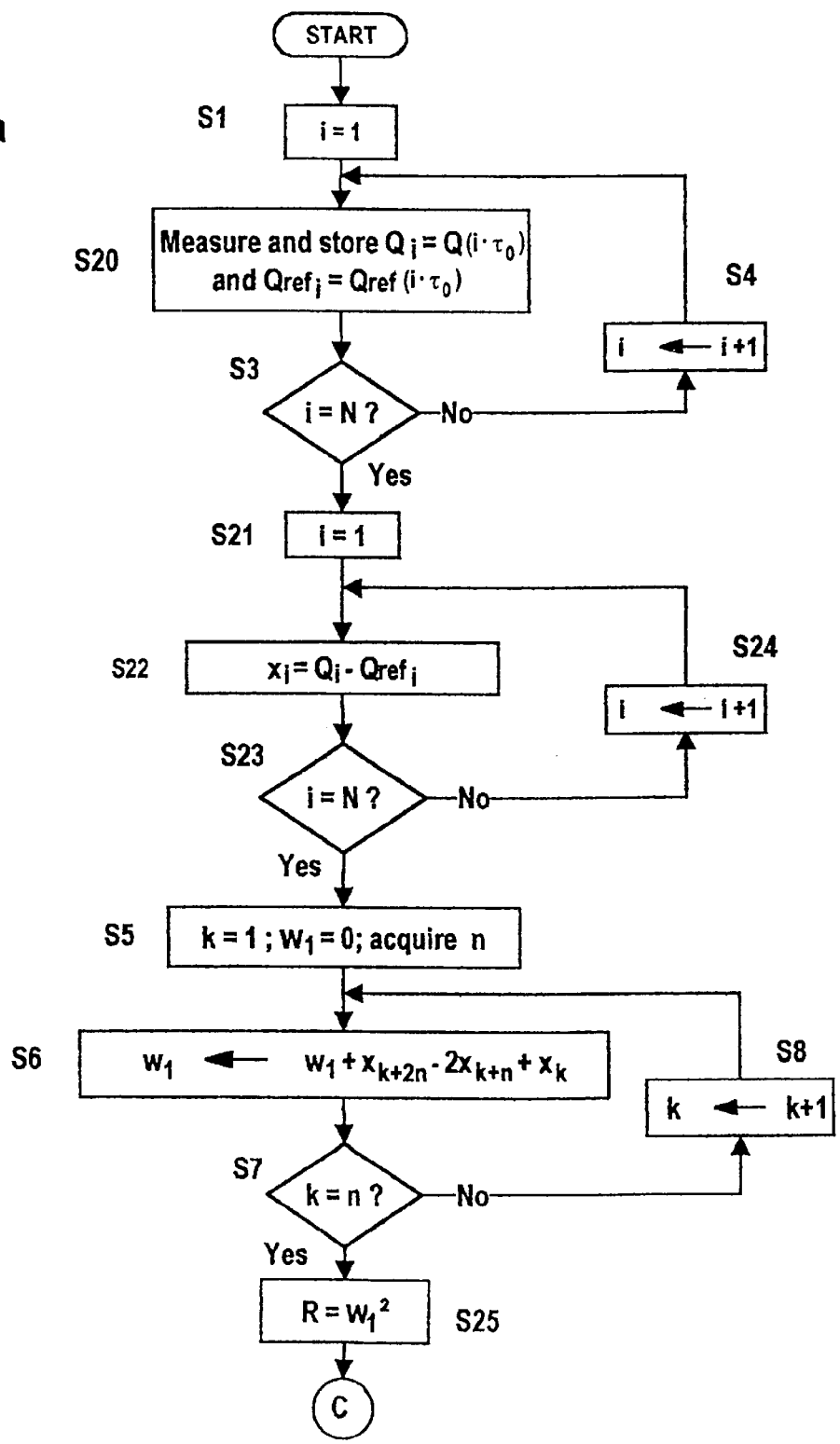
FIGS. 2a and 2b show a flow-chart illustrating a second embodiment of the present invention.
Figure 2B:
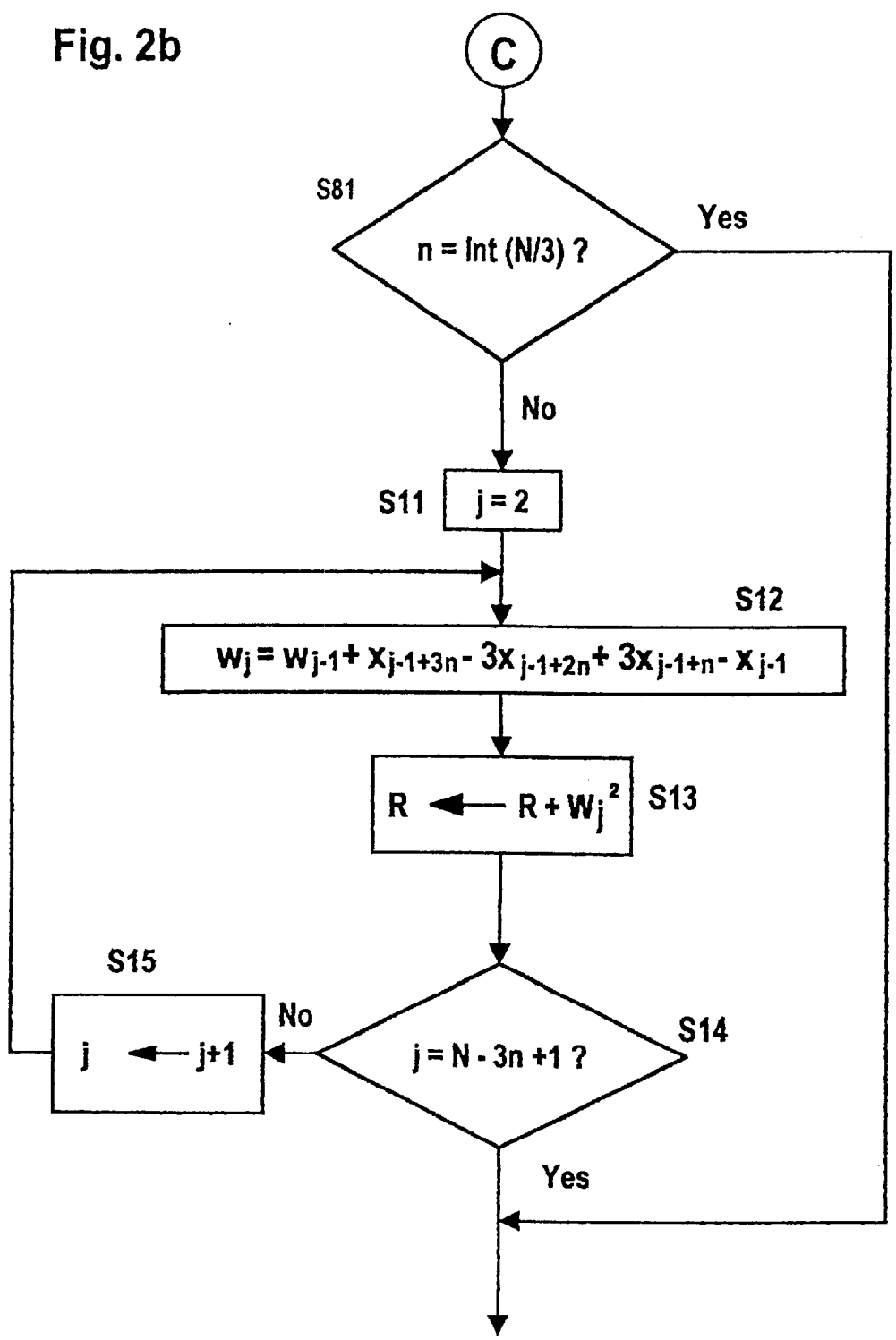

The present invention is by no means restricted to the specific embodiment described in FIGS. 1a and 1b, as a person skilled in the art will readily see that the precise steps of calculation and looping can be arranged in any desired or suitable way. An example of this is shown in FIGS. 2a and 2b which show a second embodiment of the present invention. Steps in FIGS. 2a and 2b which are the same as those already described in FIGS. 1a and 1b carry the same reference numerals and shall not be described again in detail.

Instead of one loop S2, S3 and S4 for measuring $Q_i$, $Qref_i$ and determining $x_i$, as in the case of FIG. 1, FIG. 2 has two loops S20, S3, S4 and S22, S23, S24. In other words, the measurement of $Q_i$ and $Qref_i$ and the determination of $x_i$ is performed in two subsequent loops. On the other hand, the value $R=w_1^2$ is not determined in steps S9 and S10, as in FIG. 1, but only in one step S25, which precedes the decision in step S8. Therefore, as already mentioned, the present invention can basically be implemented in any desired way, as long as the sum $$R = w_1^2 + \sum_{j=2}^{N-3n+1} w_j^2 \quad (6)$$

is determined in a recursive way by determining $w_j$ from the preceding value $w_{j-1}$.

Figure 6A:
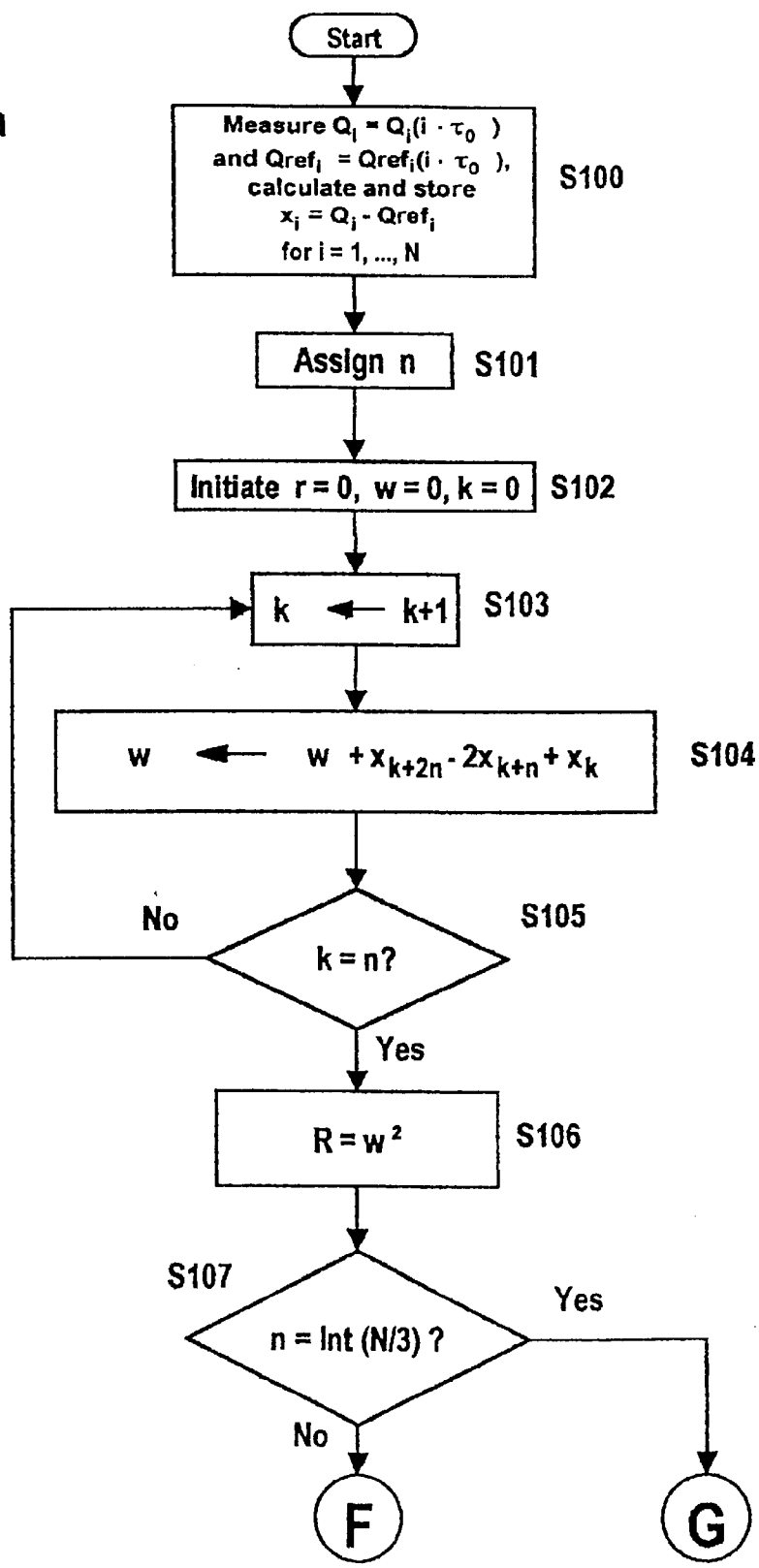
FIGS. 6a and 6b show a flow-chart illustrating a third embodiment of the present invention.
Figure 6B:
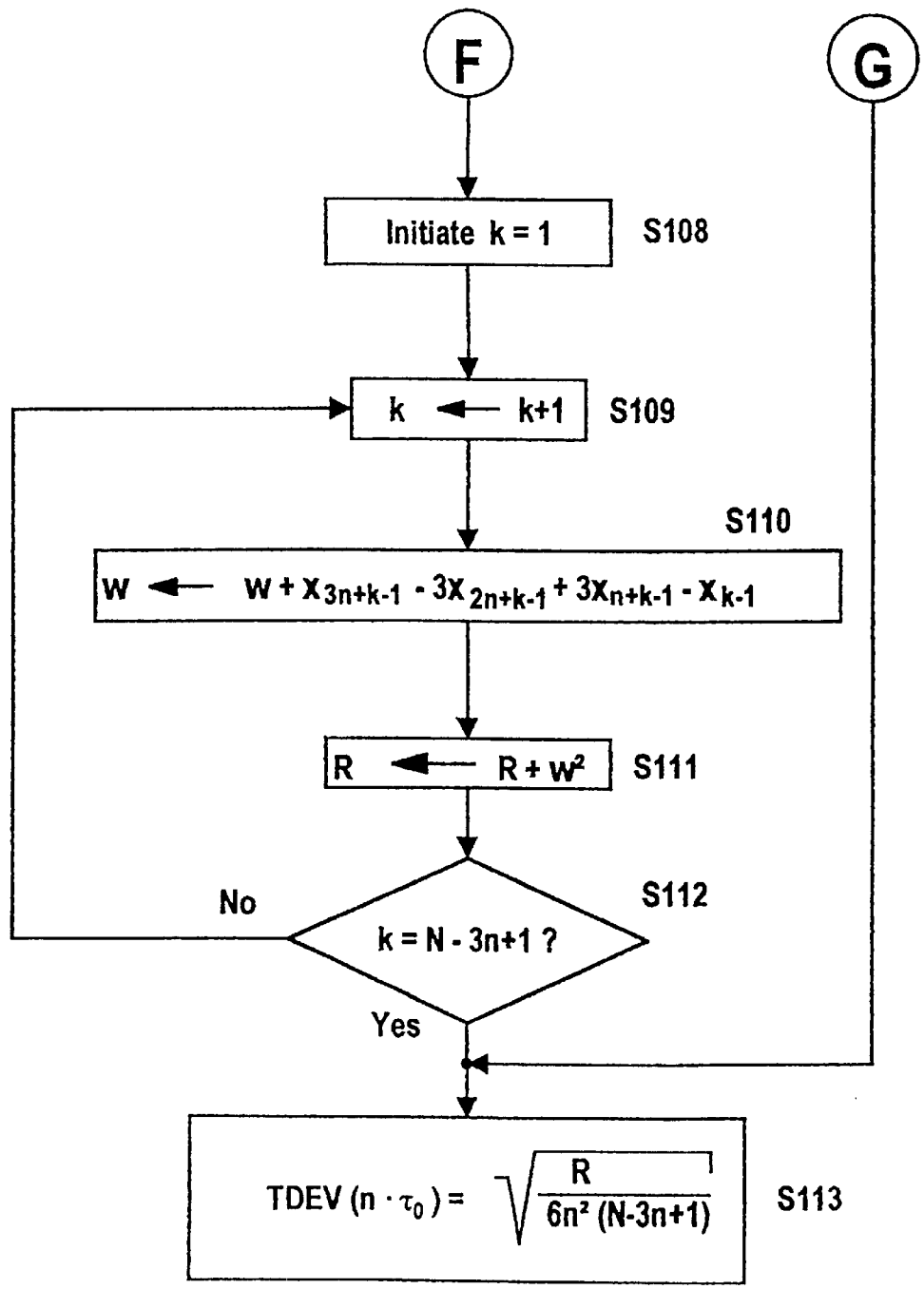

This is exemplified by a third embodiment of the present invention, a flow chart of which is shown in FIGS. 6a and 6b. The third embodiment relates to a process that determines a deviation value TDEV. In FIG. 6a, step S100 represents the determination of N values of $x_i$, similarly to the above description of the first and second embodiments. Then, in step S101, n is assigned a value between 1 and the integer part of N/3 (referred to as Int(N/3)). In the first two embodiments n was a given value with respect to the process for determining R, e.g. n was set by an external control means. As indicated in the present embodiment, the invention is by no means restricted thereto, and n can also be set in the process for determining R. It is clear that the setting of n is of no importance to the basic concept of the invention, namely the recursive determination of R, as n is only a parameter in said recursive determination process.

In step S102 and the subsequent loop consisting of steps S103 to S105, similarly to steps S5 to S8 in the previous embodiments, a first value of w is determined in accordance with $$w = \sum_{k=1}^{n} (x_{k+2n} - 2x_{k+n} + x_k).$$

Then, in step S106, a value of R is determined with the help of the above calculated value of w, namely $R=w^2$. If the value of n is equal to Int(N/3), then the calculation of R is complete, as step S107 will then branch to step S113 (see FIG. 6b) to calculate TDEV on the basis of the shown equation. On the other hand, if n is smaller than Int(N/3), then R will be calculated recursively in accordance with $$R = w_1^2 + \sum_{j=2}^{N-3n+1} w_j^2 \qquad (6)$$

and $$w_j = w_{j-1} + x_{j-1+3n} - 3x_{j-1+2n} + 3x_{j-1+n} - x_{j-1} \qquad (7)$$

in steps S108 to S112.

Finally, after R has been determined, TDEV is calculated in step S113 in accordance with the shown equation.

A difference between the first two embodiments and the third embodiment is that in the third embodiment no vectorisation of w is necessary.

Figure 3A:
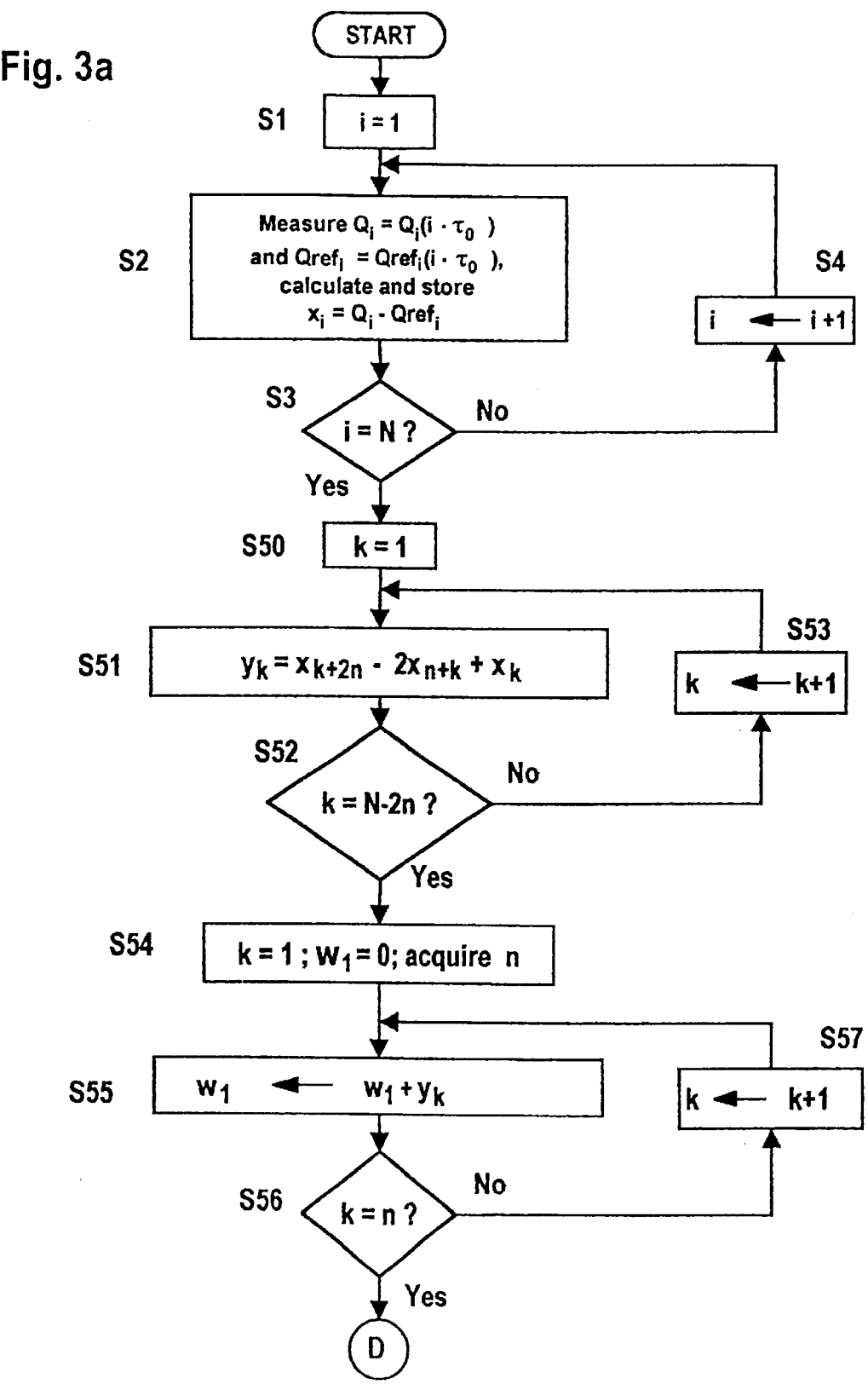
FIGS. 3a and 3b show a flow-chart illustrating a fourth embodiment of the present invention.
Figure 3B:
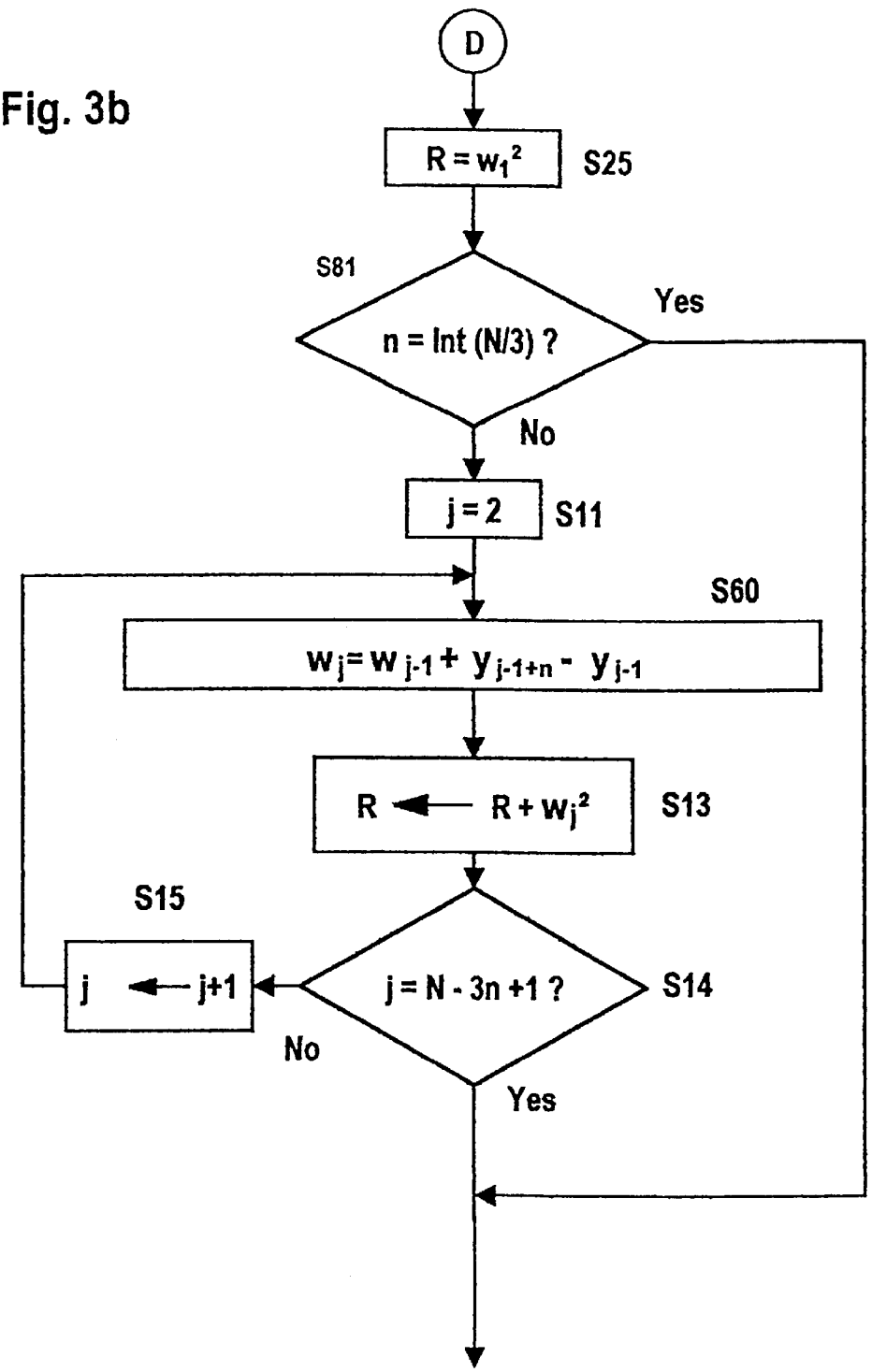

FIGS. 3a and 3b show a flow-chart of a fourth embodiment of the present invention. Steps that are the same as in FIG. 1 carry the same reference numerals and shall not be described again in detail. The first loop S2, S3 and S4, which is identical to the one shown in FIG. 1, determines error values $x_i$ which characterize the variation between a quantity Q and a reference quantity Qref. The present embodiment is characterized by the definition of a help variable $y_k$, as shown in the loop consisting of steps S51, S52 and S53. As can be seen, in a first step S50, the loop variable k is set to 1, and then the help variable $y_k$ is defined in accordance with $$y_k = x_{k+2n} - 2x_{n+k} x_k \qquad (8)$$

for values of k from 1 to N−2n. In the presently described embodiment, this is achieved by determining in step S52 if k is equal to N−2n, and if not, then incrementing k to k+1 in step S53, after which the processing returns to step S51. These values of $y_k$ are then stored.

After all of the values $y_k$ for k=1 to N−2n have been determined and stored, the processing enters a further loop referred to as S55, S56, S57. In this loop, which again runs through a loop variable referred to as k, the value $w_1$ is determined in accordance with the equation (9)

$$w_1 = \sum_{k=1}^{n} y_k \qquad (9)$$

At first, in step S54, the loop variable k is set to 1 and the value $w_1$ is set to 0. Then $w_1$ is replaced by $w_1 + y_k$ (Step S55) after which step S56 asks if k=n, and if not, then k is incremented to k+1 in step S57, after which the processing returns to step S55.

As in the case of in FIG. 2, the processing in FIG. 3 then continues with step S25, in which R is set equal to $w_1^2$, after which step S81 determines if n is equal to the integer part of N/3. If not, then the loop formed by steps S60, S13, S14 and S15 is entered, which is comparable to the loops S12, S13, S14 and S15 known from the embodiments described in connection with FIGS. 1 and 2, only that step S12 has been replaced by S60, in which the recursive determination of $w_j$ is accomplished in accordance with $$w_j = w_{j-1} + y_{j-1+n} - y_{j-1} \qquad (10)$$

Although the above described embodiment contains the additional loop S51, S52 and S53 for determining the help variable $y_k$, the resulting calculation in the recursive equation of step S60 is simplified, which can be advantageous because it requires simpler hardware, especially if the method of the present invention is implemented in the form of circuitry containing adders, subtractors, etc. On the other hand, if the invention is implemented as software in an appropriate computing device, e.g. a CPU, then the embodiment described in connection with FIG. 1 is advantageous over that described in connection with FIG. 3, because the method embodied by the flow-chart of FIG. 1 contains one loop less than that of FIG. 3.

As already mentioned in connection with FIG. 1, the value R determined by the methods described in connection with FIGS. 2 and 3 can also be further employed in any suitable and desired way, e.g. output to a control means that is controlled in accordance with the variation between Q and Qref, or processed further, e.g. for calculating a variance $$VAR = \frac{R}{6n^2(N-3n+1)} \qquad (11)$$

or a deviation $$DEV = \sqrt{\frac{R}{6n^2(N-3n+1)}} \qquad (12)$$

The value R determined by the methods in accordance with the above described embodiments is equal to the double sum $$\sum_j \left[ \sum_i (x_{i+2n} - 2x_{i+n} + x_i) \right]^2 \qquad (3)$$

described in the introduction. As already mentioned, the value n, which can be assigned any value between 1 and the integer part of N/3 describes the number of sampling intervals within one observation interval. This is explained in connection with FIG. 4, in which a number N of sampling intervals along the direction of a parameter t (for example time) are shown, each interval having a length of $\tau_0$. In the specific example of FIG. 4, N=12. The observation interval $n\tau_0$ relates to the triplets of values x associated with each sampling interval, i.e. $x_{i+2n}$, $x_{i+n}$, $x_i$.

According to a preferred embodiment, the method of the present invention is employed such that all values of R relating to individual values of n, i.e. for all values of n from 1 to the integer part of N/3 are calculated. These values can then be processed further, e.g. for calculating the deviation DEV according to $$DEV = \sqrt{\frac{R}{6n^2(N-3n+1)}} \qquad (12)$$

for each value of n from 1 to the integer part of N/3, in order to use these deviation values as appropriate characterization parameters.

Such a measurement of all of the possible values R can simply be accomplished by introducing a further loop, as e.g. done in FIG. 5, which is a modification of the embodiment shown in FIG. 1. All of the steps that are the same as in FIG. 1 carry the same reference numerals and shall not be described again. In addition to the steps of FIG. 1, the embodiment for calculating the values for n from 1 to the integer part of N/3 has the supplementary step S70 between steps S3 and S5, in which the loop parameter n is initially set to 1, and the supplementary steps S71, S72 and S73, where the value R calculated for a specific value n is stored in association with n in step S71, and steps S72 and S73 for the outer loop running over n, where S72 asks if n has reached the maximum value which is the integer part of N/3 and if not, then the processing proceeds to steps S73, in which n is incremented to n+1.

After step S73, the loop returns to S5. As in the cases of the previous embodiments, the values R can be processed or output in any suitable or desired way.

Figure 5A:
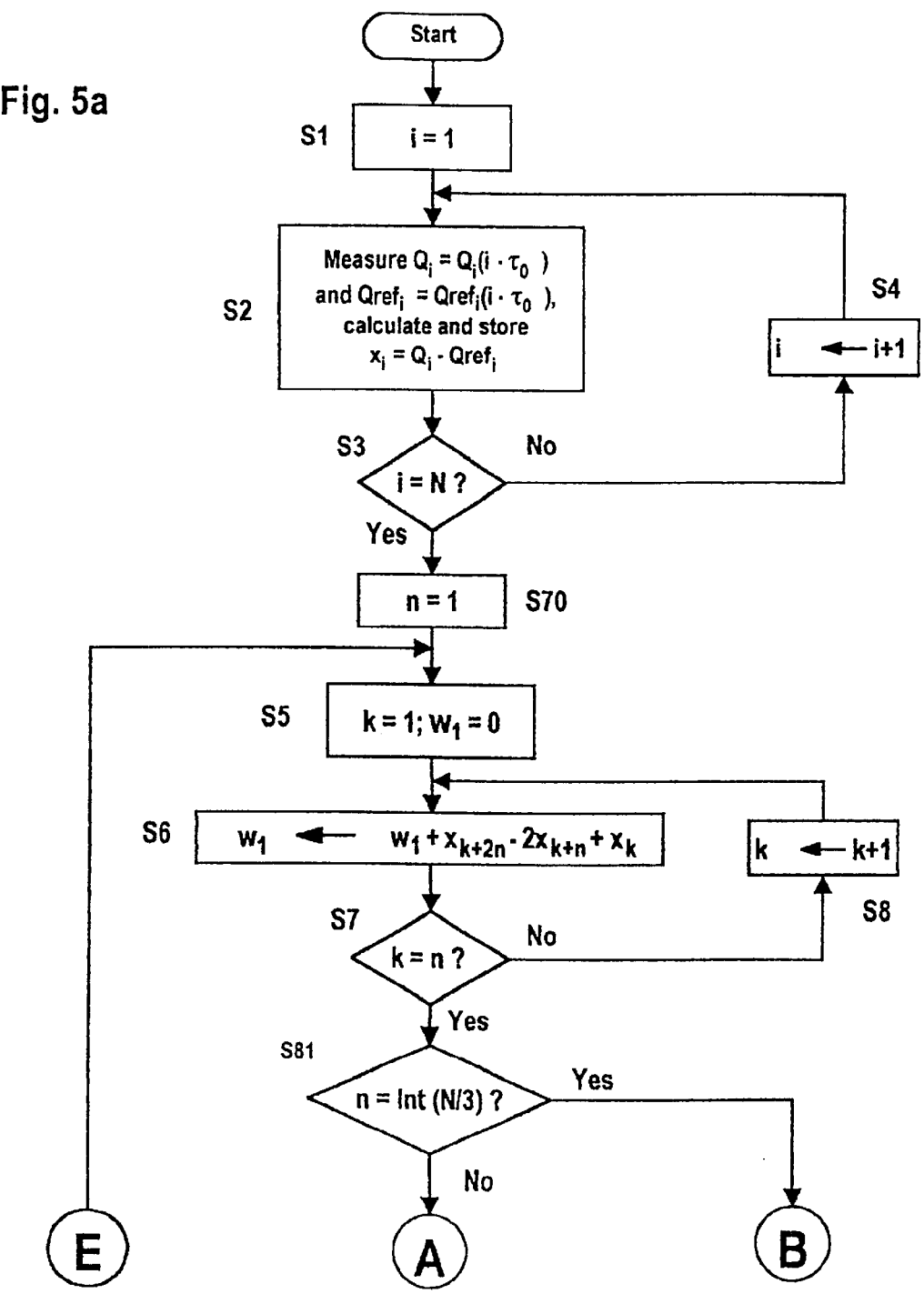
FIGS. 5a and 5b show a flow-chart illustrating an embodiment that is a modification of the embodiment shown in FIG. 1.
Figure 5B:
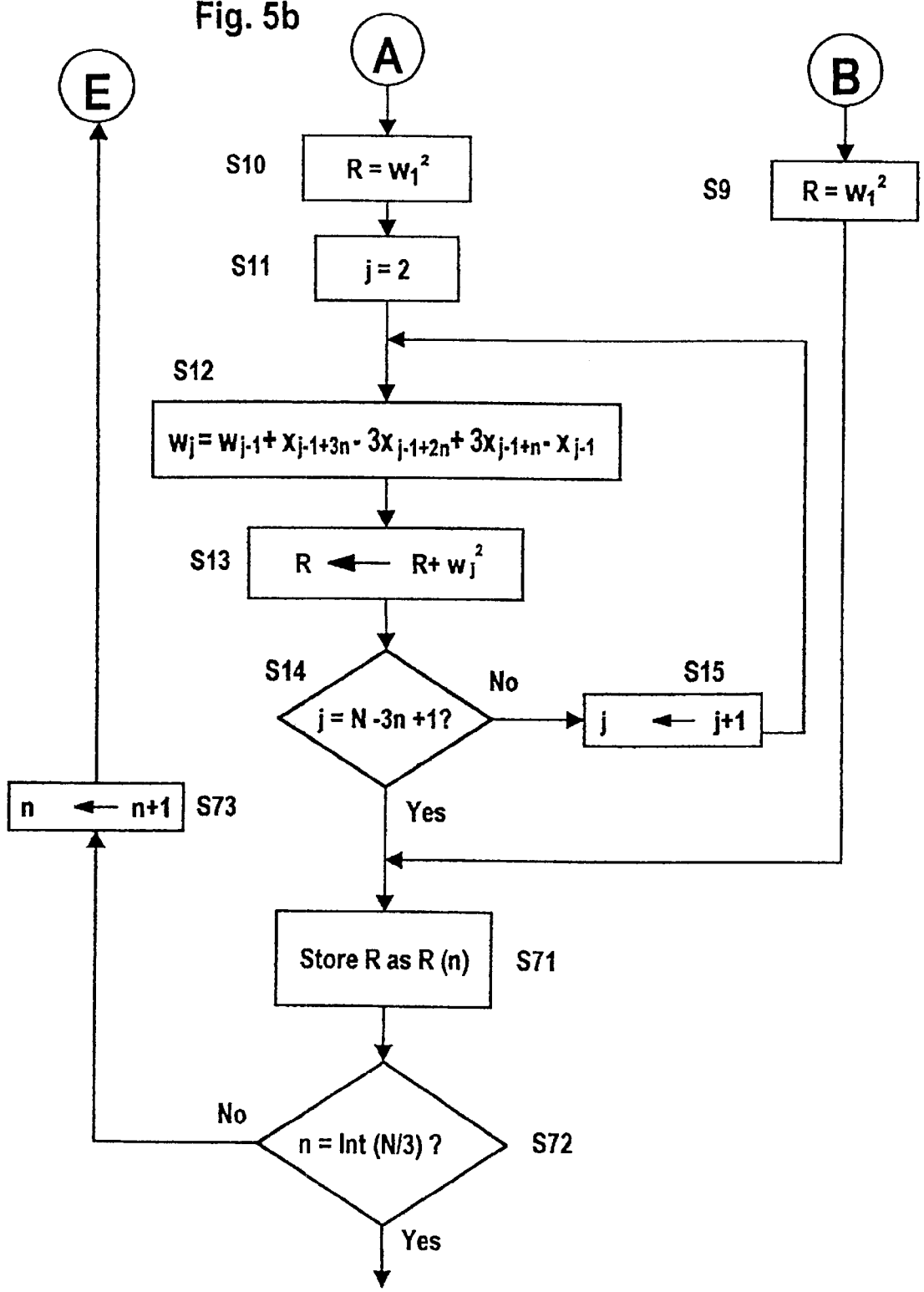

It is clear that the embodiment described in connection with FIGS. 5a and 5b can also be realized in other ways, for example also in connection with the embodiments described in FIGS. 2 and 3. The modification of the method shown in FIG. 2 would consist in introducing the step S70 shown in FIG. 5a between steps S23 and S5 and FIG. 2a, and adding steps S71, S72 and S73 at the end of the processing in FIG. 2b, as done in FIG. 5b. Similarly, the method described in connection with FIG. 3a would be modified by adding step S70 between steps S52 and S54 of FIG. 3a and adding steps S71, S72 and S73 at the end of the processing in FIG. 3b. This is readily understandable to a person skilled in the art.

Figure 7A:
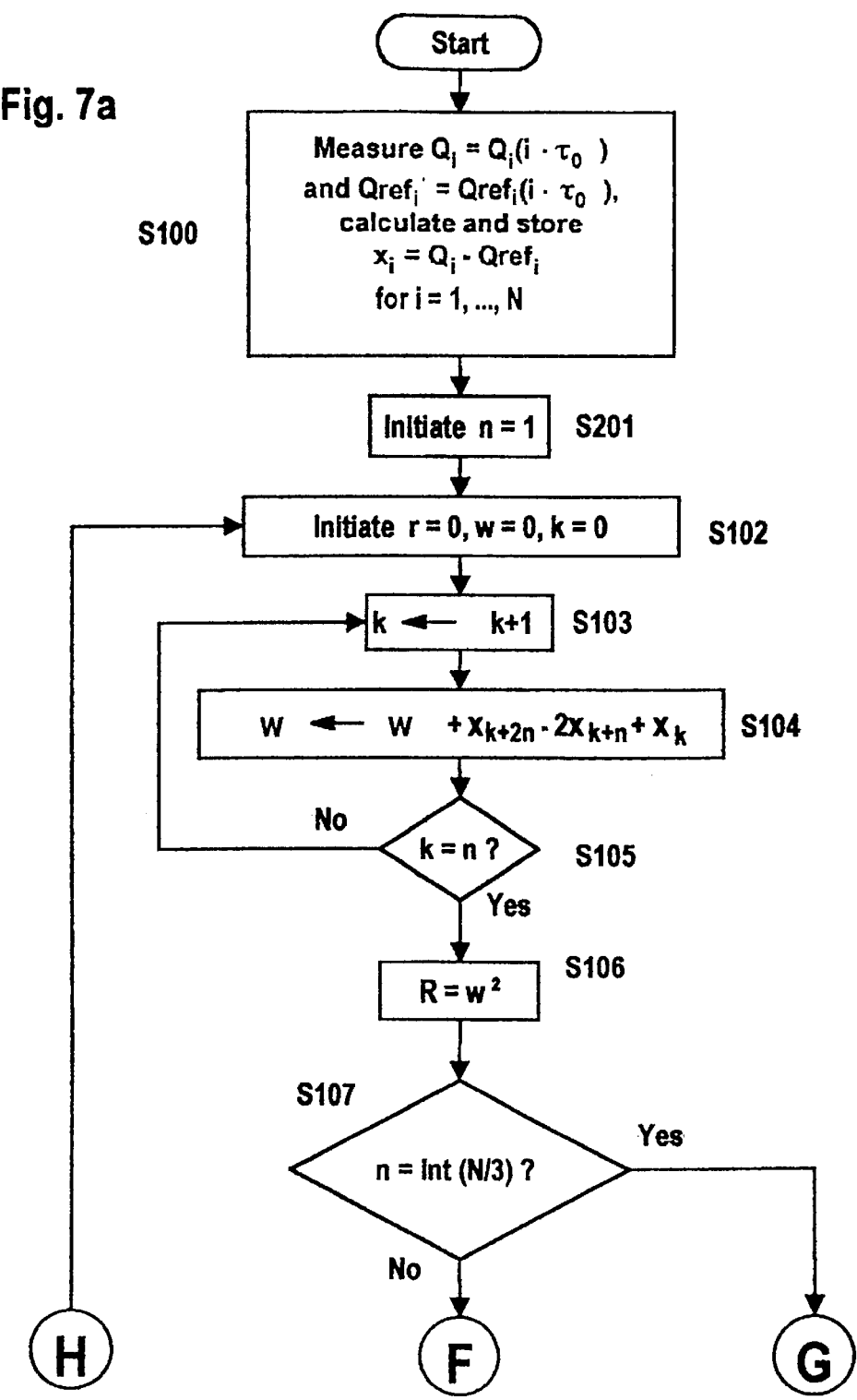
FIGS. 7a and 7b show a flow-chart illustrating an embodiment of the present invention that is a modification of the embodiment shown in FIG. 6.
Figure 7B:
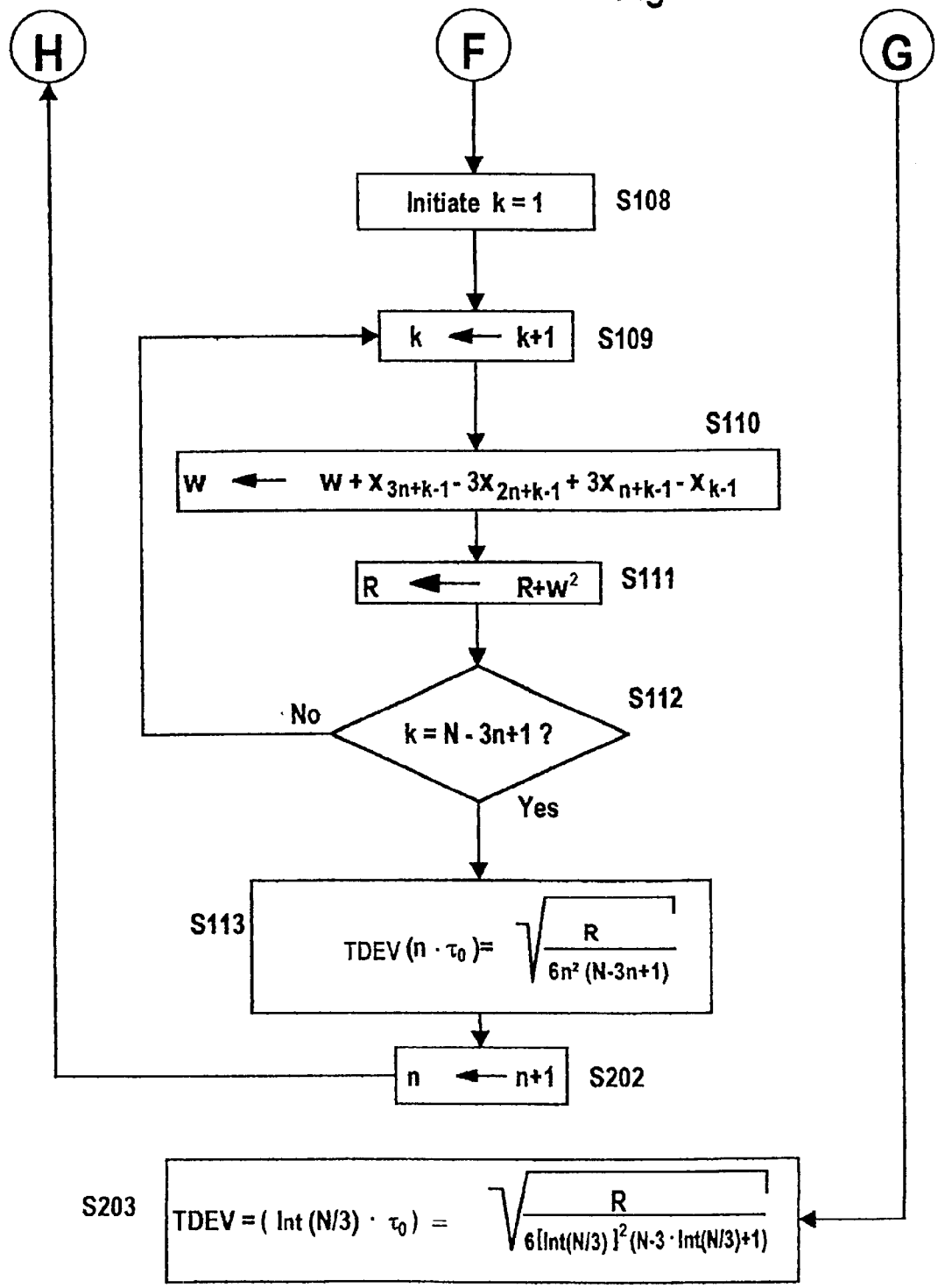

FIGS. 7a and 7b show a modification of the embodiment of FIG. 6, where steps S201, S202 and S203 have been added in order to implement a calculation of TDEV(n $\tau_0$) for all values of n from 1 to the integer part of N/3. As can be seen, the loop for n is initialized in step S201 and loops back in step S202, and step S107 exits the loop when n is equal to the integer part of N/3.

As already mentioned in connection with the embodiment of FIG. 1, the precise order and implementation of calculations and loopings in the embodiments of FIGS. 2, 3, 5, 6 and 7 is not important to the invention as long as the value R is calculated by recursively determining w in accordance with $w_j = w_j(w_{j-1})$, i.e. from the previous value of w, and as a function of the difference values x, e.g. either by $$w_j = w_{j-1} + x_{x-1+3n} - 3x_{j-1+2n} + 3x_{j-1+n} - x_{j-1} \tag{7}$$

or by $$w_j = w_{j-1} + y_{j-1+n} - y_{j-1} \tag{10}.$$

As can be seen in the embodiment of FIG. 5, the calculation of the values R for all values of n leads to one nested loop, in contrast to the conventional calculation which contains two nested loops, namely one for the inner sum $$\sum_j \left[ \sum_i (x_{i+2n} - 2x_{i+n} + x_i) \right]^2 \tag{3}$$

and a second one for the outer loop running over n. Again, the number of calculations is reduced by a factor of N in the present invention, as the number or required calculations in accordance with the embodiment shown in FIG. 5 is in the order of $N^2$ whereas the conventional calculation is in the order of $N^3$.

As a best mode of putting the invention to practice, the inventor presently considers the method described in connection with FIGS. 7a and 7b, where the quantity Q is a clock signal T, Qref is a reference clock signal Tref, such that the values $x_i$ are time error samples. The values R are calculated for all possible values of n, i.e. from n=1 to n=the integer part of N/3, such that a complete set of values of the time deviation $$TDEV(n\tau_0) = \sqrt{\frac{1}{6n^2} \frac{1}{(N-3n+1)} \sum_{j=1}^{N-3n+1} \left[ \sum_{i=j}^{n+j-1} (x_{1+2n} - 2x_{i+n} + x_i) \right]^2} \tag{2}$$

can be calculated from the values R through $$DEV = \sqrt{\frac{R}{6n^2(N-3n+1)}} \tag{12}$$

for all possible values of n. These values TDEV ($n\tau_0$) can then be used for characterization or supervision of reference timing signals.

The precise implementation of the present invention in terms of hardware or software can be done in any suitable or desired way. For example, if a used software language has a provision such that if the running variable of a FOR-loop is outside of the range given by the upper and lower values of the FOR-loop, said FOR-loop is not entered, then e.g. the decision step S81 and loop consisting of S11, S14 and S15 in FIG. 2b can be implemented by such a FOR-loop running from k=2 to N-3n+1. In other words, the decision step S81 would be implicitly contained in the above mentioned FOR-loop.

Although the present invention has been described in terms of specific embodiments, it is by no means restricted thereto. Much rather, the scope of the invention is defined by the appended claims. Reference symbols in the claims serve the purpose of better understanding and do not restrict the scope.

What is claimed is:

1. A method for synchronizing clock signals in a communication system by determining a deviation between a clock signal quantity (Q) and a reference clock signal quantity (Qref) associated with said clock signal quantity, both depending on a predetermined time parameter (t), comprising:

measuring N samples ($Q_i$, $Qref_i$) of said clock signal quantity (Q) and said reference clock signal quantity (Qref) at equally spaced intervals ($\tau_0$) of said time parameter (t), N being an integer with $N \geq 3$, calculating and storing N difference values $x_i$ between each sample of said clock signal quantity ($Q_i$) at each sample of said reference clock signal quantity ($Qref_i$) and each of said N sample points, the index i being an integer running from 1 to N, calculating a value $w_1$ as a function of said difference values $x_i$, calculating a value R representative of the variation between said clock signal quantity and said reference clock signal quantity as $$R = w_1^2 + \sum_{j=2}^{N-3n+1} w_j^2$$

where n is an integer from the set of 1 to the integer part of N/3, and each value $w_j$ with j>1 is calculated recursively from the previous value $w_{j-1}$ and as a function of said difference values $x_i$, if n is smaller than the integer part of N/3, and calculating said value R as $R = w_1^2$ if n is equal to the integer part of N/3.

2. The method according to claim 1, further comprising calculating said value $w_1$ according to the equation $$w_1 = \sum_{k=1}^{n} (x_{k+2n} - 2x_{k+n} + x_k),$$

and calculating said each value $w_j$ with j>1 from the previous value $w_{j-1}$ in accordance with $$w_j = w_{j-1} + x_{j-1+3n} - 3x_{j-1+2n} + 3x_{j-1+n} - x_{j-1}.$$

3. The method according to claim 1, further comprising calculating and storing values $y_k$ defined as $$y_k = x_{k+2n} - 2x_{n+k} + x_k,$$

for k=1 to N−2n, calculating said value $w_1$ according to the equation $$w_1 = \sum_{k=1}^{n} y_k,$$

and calculating said each value $w_j$ with j>1 from the previous value $w_{j-1}$ in accordance with $$w_j = w_{j-1} + y_{j-1+n} - y_{j-1}.$$

4. The method of claim 1, wherein a variance value VAR is calculated as $$VAR = \frac{R}{6n^2(N - 3n + 1)}.$$

5. The method of claim 4, wherein said variance value is calculated for each value of n from 1 to the integer part of N/3.

6. The method of claim 1, wherein a deviation value DEV is calculated as $$DEV = \sqrt{\frac{R}{6n^2(N - 3n + 1)}}.$$

7. The method of claim 6, wherein said deviation value is calculated for each value of n from 1 to the integer part of N/3.

8. The method of claim 1, wherein said parameter on which said quantity and said reference quantity depend is time.

9. The method of claim 8, wherein said quantity is a timing signal and said reference quantity is a reference timing signal.

10. The method of claim 1, wherein said parameter on which said quantity and said reference quantity depend is location.

11. The method of claim 10, wherein said quantity is a surface profile level and said reference quantity is a reference profile level.

12. A device for synchronizing clock signals in a communication system by determining a deviation between a clock signal quantity (Q) and a reference clock signal quantity (Qref) associated with said clock signal quantity, both depending on a predetermined time parameter (t), comprising:

a measuring means for measuring N samples ($Q_i$, $Qref_i$) of said clock signal quantity (Q) and said reference clock signal quantity (Qref) at equally spaced intervals ($\tau_0$) of said time parameter (t), N being an integer with N≧3, a calculating and storing means for calculating and storing N difference values $x_i$ between each sample of said clock signal quantity ($Q_i$) and each sample of said reference clock signal quantity ($Qref_i$) at each of said N sample points, the index i being an integer running from 1 to N, a calculating means for calculating a value $w_1$ as a function of said difference values $x_i$, for calculating a value R representative of the variation between said quantity and said reference quantity as $$R = w_1^2 + \sum_{j=2}^{N-3n+1} w_j^2$$

where n is an integer from the set of 1 to the integer part of N/3, and each value $w_j$ with j>1 is calculated recursively from the previous value $w_{j-1}$ and as a function of said difference values $x_i$, if n is smaller than the integer part of N/3, and for calculating said value R as $R = w_1^2$ if n is equal to the integer part of N/3.

13. The device according to claim 12, wherein said calculating means calculates said value $w_1$ according to the equation $$w_1 = \sum_{k=1}^{n} (x_{k+2n} - 2x_{k+n} + x_k),$$

and calculates said each value $w_j$ with j>1 from the previous value $w_{j-1}$ in accordance with $$w_j = w_{j-1} + x_{j-1+3n} - 3x_{j-1+2n} + 3x_{j-1+n} - x_{j-1}.$$

14. The device according to claim 12, wherein said calculating means calculates and storing values $y_k$ defined as $$y_k = x_{k+2n} - 2x_{n+k} + x_k,$$

for k=1 to N−2n, calculates said value $w_1$ according to the equation $$w_1 = \sum_{k=1}^{n} y_k,$$

and calculates said each value $w_j$ with j>1 from the previous value $w_{j-1}$ in accordance with $$w_j = w_{j-1} + y_{j-1+n} - y_{j-1}.$$

* * * * *